(12) United States Patent
Krasutsky

(10) Patent No.: US 8,081,381 B2
(45) Date of Patent: Dec. 20, 2011

(54) LASER BEAM COMBINING BY POLARIZATION INTERLACING

(75) Inventor: Nicholas J. Krasutsky, Carrollton, TX (US)

(73) Assignee: Lockhead Martin Corporation, Bethesda, MD (US)

( * ) Notice: Subject to any disclaimer, the term of this patent is extended or adjusted under 35 U.S.C. 154(b) by 698 days.

(21) Appl. No.: 12/177,559

(22) Filed: Jul. 22, 2008

(65) Prior Publication Data

US 2009/0195874 A1   Aug. 6, 2009

Related U.S. Application Data

(60) Provisional application No. 60/951,853, filed on Jul. 25, 2007.

(51) Int. Cl.
  *G02B 27/28* (2006.01)
(52) U.S. Cl. ............ 359/485.07; 359/489.09; 359/636
(58) Field of Classification Search ........... 359/485, 359/494, 495, 501, 629, 636
  See application file for complete search history.

(56) References Cited

U.S. PATENT DOCUMENTS

| | | | | |
|---|---|---|---|---|
| 3,363,103 A * | 1/1968 | Fowler et al. | ............ | 398/98 |
| 3,604,936 A * | 9/1971 | Kompfner | ............ | 398/52 |
| 3,670,166 A * | 6/1972 | Kaminow | ............ | 398/101 |
| 6,366,390 B1 * | 4/2002 | King et al. | ............ | 359/264 |
| 6,607,313 B1 * | 8/2003 | Farries et al. | ............ | 398/102 |
| 6,711,315 B1 * | 3/2004 | Joseph et al. | ............ | 385/17 |
| 7,120,364 B2 * | 10/2006 | Kovar et al. | ............ | 398/190 |
| 7,445,339 B2 * | 11/2008 | Dvorkis et al. | ............ | 353/8 |
| 2006/0239607 A1 * | 10/2006 | Yamamoto et al. | ............ | 385/16 |
| 2008/0082085 A1 | 4/2008 | Krasutsky | ............ | 606/2 |
| 2010/0290126 A1 * | 11/2010 | Domjan et al. | ............ | 359/630 |

OTHER PUBLICATIONS

Karl Lambrecht Corporation, "Glan Laser Beam Combining/ Splitting", downloaded Jul. 24, 2007 from http://www.klccgo.com/glanlasersbs.htm.

Electro Optical Components, Inc., "Optical Isolators/Faraday Rotators", downloaded Jul. 24, 2007, from http://www.eoc-inc.com/leysop/Faraday_optical_isolator_rotators.htm.

Lauren Publishing, Inc., "Faraday Rotators—Photonics Buyers' Guide: Products & Manufacturers", published 1996-2006, and downloaded Jul. 24, 2007, from http://www.photonics.com/directory/bg/category.asp?bgpsa=24400.

Electro Optical Components, Inc., "Application Notes for Faraday Rotators and Isolators" published 2007 and downloaded Jul. 24, 2007, from at http://www.eoc-inc.com/leysop/app notes faraday isolators rotators.htm.

* cited by examiner

*Primary Examiner* — Frank Font
(74) *Attorney, Agent, or Firm* — Lee, Jorgensen, Pyle & Kewalramani

(57) ABSTRACT

The present invention is a time division multiplexed beam combination for laser signal generation. In one aspect, the time division multiplexed beam combination employs a mechanical implementation. In a second aspect, the time division multiplexed beam combination employ a polarization interlacing.

23 Claims, 3 Drawing Sheets

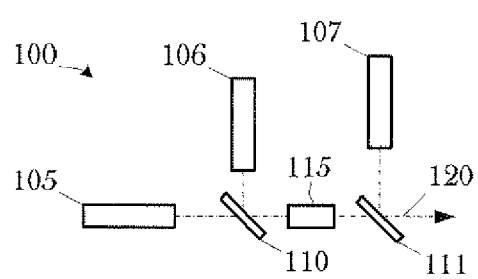
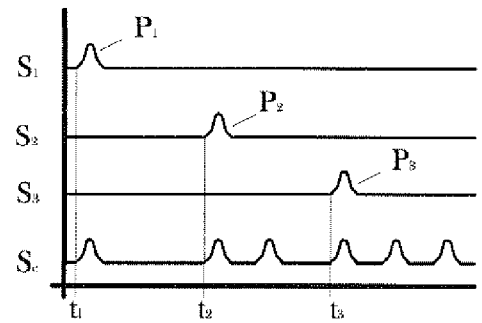
FIG. 1
FIG. 2
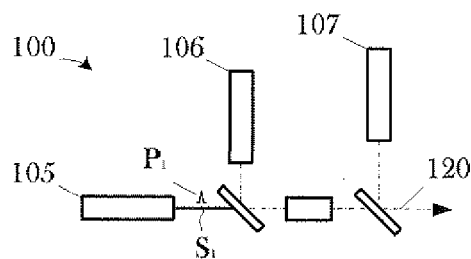
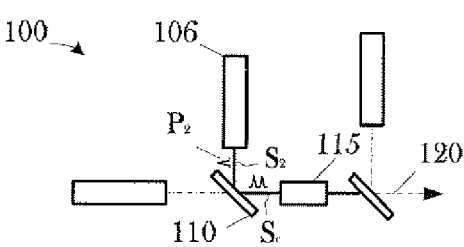
FIG. 3A
FIG. 3B
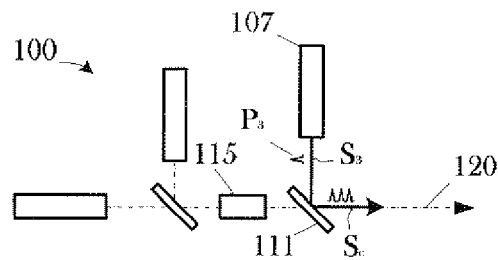
FIG. 3C

LASER BEAM COMBINING BY POLARIZATION INTERLACING

The earlier effective filing date of U.S. Provisional Application Ser. No. 60/951,853, filed Jul. 25, 2007, in the name of the inventor Nicholas J. Krasutsky, and entitled "Laser Beam Combining by Polarization Interlacing", is hereby claimed under 35 U.S.C. §119.

BACKGROUND OF THE INVENTION

1. Field of the Invention

The present invention is directed to lasers, and, more particularly, to a technique for generating a combined laser beam.

2. Description of the Related Art

Despite a great deal of investment, attempts to develop monolithic, very high power lasers have met with only very limited success. This is generally because the technology does not scale well with the output power produced. Thermal issues tend to present the greatest challenge and therefore generally are the limiting factors. For example, higher power lasers generate larger amounts of waste heat than become increasingly difficult to dispose of as the power scales upward. But other issues become problematical as well. Non-linear effects begin to predominate, and it becomes more difficult to input the prime power to the laser. Pulsed and continuous wave laser systems suffer from similar problems.

Alternative approaches attempting to overcome these problems include coherent beam combining, wavelength division multiplexing, and geometric overlap at a point. Coherent beam combining has been effective in producing a single, diffraction limited coherent beam. However, this approach places extremely stringent requirements on the laser system and fill factor is often a problem. Open results have proven the principle, but has failed to establish the utility. Wavelength division multiplexing has a long history in the telecommunications industry, which uses low power. But, it requires tunable lasers and wavelength separation requirements limit the number of lasers. Furthermore, the beam combiner is a high loss component and is delicate (i.e., fragile, or not rugged). Geometric overlap techniques have been demonstrated to produce very high powers and are used in, for example, fusion experiments. However, the resultant beams are not suitable for directing energy at range.

Thus, in general, these alternative approaches have not produced high power laser signals at range. They generally impose stringent requirement on beam properties and achieve only modestly higher powers than the low power lasers they employ. In fact, they typically do not generate powers much higher than that which can be obtained from a single optimized laser. These inadequacies are compounded in applications at long range, where the combined beam should look and act like a single, diffraction limited beam to be operationally effective. Simple, effective, long range high power laser systems still have yet to be introduced to the art.

The present invention is directed to resolving, or at least reducing, one or all of the problems mentioned above.

SUMMARY OF THE INVENTION

The present invention is a time division multiplexed beam combination for laser signal generation. In one aspect, the time division multiplexed beam combination employs a mechanical implementation. In a second aspect, the time division multiplexed beam combination employ a polarization interlacing.

BRIEF DESCRIPTION OF THE DRAWINGS

The invention may be understood by reference to the following description taken in conjunction with the accompanying drawings, in which like reference numerals identify like elements, and in which:

FIG. 1 depicts one particular embodiment of the present invention in a functional block diagram;

FIG. 2 is a diagram for the signals generated in the operation of the embodiment of FIG. 1;

FIG. 3A-FIG. 3C illustrate the operation of the embodiment in FIG. 1;

Figure 4A:
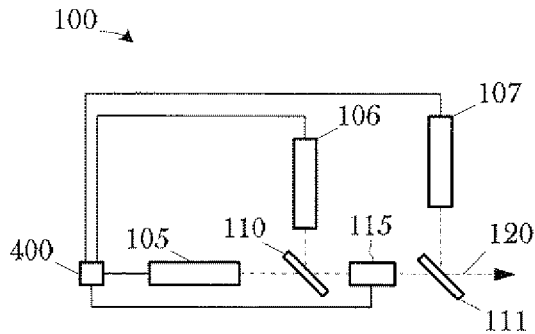
FIG. 4A-FIG. 4B illustrate the controller of FIG. 1 in greater detail.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

This disclosure describes a method of combining pulsed laser signals by interlacing their pulses along the same optical path. There are no coherency or wavelength requirements on the laser signals. Interlacing is accomplished by altering the optical path between each laser and the output during the time that the respective laser fires, such that all pulses are output in a single direction. The optical path is changed by mechanical means, e.g., moving a mirror to alter the optical path between laser firings or is change by reconfiguring with active polarization elements.

The polarization interlacing technique disclosed herein can be scaled to a multitude of pulsed lasers by use of a series of active polarization rotators. These polarization rotators are used to reconfigure the optical path between laser pulses so that each laser is pointed along the same output path for the period in which it is firing. The laser signals are polarized. It is not necessary, although it is convenient that all laser pulse repetition frequencies be the same. Pulses of different polarizations are separated in time when they arrive at each active rotator.

Consider the apparatus 100 of FIG. 1. The apparatus 100 comprises a plurality of lasers 105-107, a plurality of polarization combiners 110-111, and at least one active polarization rotator 115. The apparatus 100, in operation, interlaces the pulsed, polarized laser signals (not shown in FIG. 1) on the optical path 120 to produce a combined laser signal. More particularly, when a laser 105-106 fires, the pulse (depending on its polarization) reflects off or passes through first polarization combiner 110 and, if needed, is rotated by the rotator 115. The rotator 115 is activated while the laser 106 is firing. Both pulses will continue in the direction of designated output optical path 120. This process can be scaled for larger numbers of components.

The polarizations of the pulses from each laser 105-107 are at predetermined angles with respect to the polarization combiner axes when they enter the system so they will continue along the optical path after interacting with the combiner. All the lasers are either the same polarization or orthogonal (rotated 90°). If one needs to change the starting polarization direction, either rotate the laser (brute force), or put in a passive polarization rotator.

FIG. 2 includes a representative timing diagram for the laser signals shown in FIG. 3A-FIG. 3C at times $t_1$-$t_3$. At time $t_1$, as shown in FIG. 3A, the laser 105 fires and transmits a pulse $P_1$ onto the optical path 120. Pulse $P_1$ continues through polarization combiner 110 and through the polarization rotator 115 which is turned off while the pulse $P_1$ passes through it. At time $t_2$, as shown in FIG. 3B, laser 106 fires, transmitting the pulse $P_2$. Because of the polarization of the signal $S_2$, the pulse $P_2$ is reflected by the polarization combiner 110 onto the optical path 120. During the time interval between which pulse $P_1$ and $P_2$ pass through the rotator 115 the rotator 115 is turned on so the polarization of pulse $P_2$ is rotated into alignment with pulse P1. The combined signal $S_c$ is, after time $t_2$, comprised of pulses $P_1$-$P_2$. At time $t_3$, as shown in FIG. 3C, the laser 107 fires, transmitting the pulse $P_3$. Because of the polarization of the signal $S_3$, it is reflected by the polarization combiner 111 onto the optical path 120. Because of the polarization of the combined signal $S_c$, it passes through the polarization combiner 111. Thus, after time $t_3$, the combined signal $S_c$ comprises the three pulses $P_1$-$P_3$.

Pulse repetition frequencies for the lasers 105-107 may be implementation specific. For example, anything from down to a few hertz up to the multi-kilohertz range for the laser pulse rate is fine for most applications. If different frequencies are used then they should be sub-multiples of each other or eventually there will be some pulses that overlap. Again, the pulses of different polarizations should be separated in time when they arrive at each active rotator. This amount of time will also be implementation specific, but times such as 5 to 10 nanoseconds for fast rotators will typically suffice.

Figure 4B:
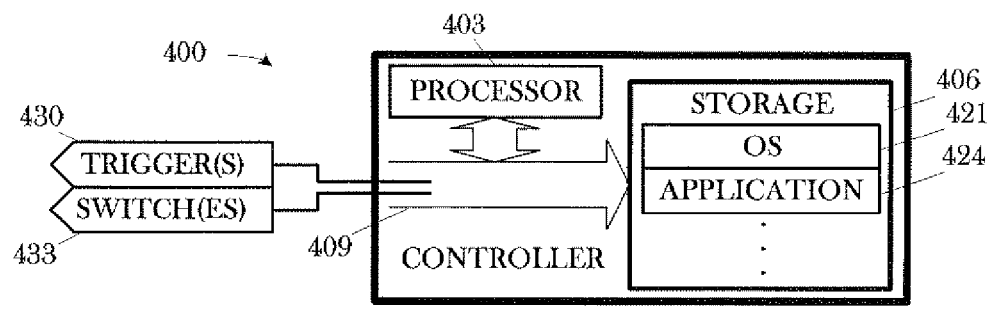

Although not shown previously for the sake of clarity, the apparatus 100 operates under the direction of a controller 400, shown in FIG. 4A-FIG. 4B. The controller 400 may be implemented in hardware, software, or some combination of the two. FIG. 4B depicts selected portions of the controller 400, first shown in FIG. 4A, in a block diagram. The controller 400 includes a processor 403 communicating with storage 405 over a bus system 409.

In general, the controller 400 will handle a fair amount of data, some of which may be relatively voluminous by nature and which is processed quickly. Thus, certain types of processors may be more desirable than others for implementing the processor 403. For instance, a digital signal processor ("DSP") may be more desirable for the illustrated embodiment than will be a general purpose microprocessor. In some embodiments, the processor 403 may be implemented as a processor set, such as a microprocessor with a mathematics co-processor.

The storage 405 may be implemented in conventional fashion and may include a variety of types of storage, such as a hard disk and/or random access memory ("RAM"). The storage 405 will typically involve both read-only and writable memory implemented in disk storage and/or cache. Parts of the storage 405 will typically be implemented in magnetic media (e.g., magnetic tape or magnetic disk) while other parts may be implemented in optical media (e.g., optical disk). The present invention admits wide latitude in implementation of the storage 405 in various embodiments. The storage 405 is also encoded with an operating system 421, and an application 424. The processor 403 runs under the control of the operating system ("OS") 421, which may be practically any operating system known to the art.

Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The controller 400 tracks and controls the firing of the lasers 105-107 and makes sure the correct rotators are set to get the optical path aligned between the laser and the output. The combiners are passive elements and do not change. The application 424, upon invocation by the processor 403 over the bus system 409, times the operation of the apparatus 100 as described above and generates the control signals for the lasers 105-107 and the active polarization rotator 115. More particularly, the application 424 generates the triggers 430 for the lasers 105-107 at the correct times as well as the switch signals 433 for the active polarization rotator 115.

Figure 5:
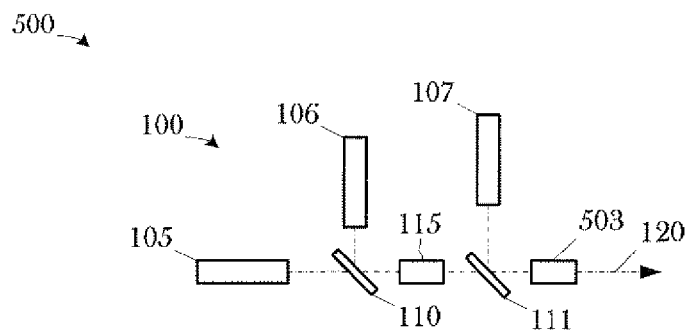
FIG. 5-FIG. 8 present embodiments of the present invention alternative to that in FIG. 1.

In one alternative embodiment 500, shown in FIG. 5, an optional polarization rotator 503 is positioned at the output of the optical path 120 for the apparatus 100 there is a desire to render the output beam polarized. If the optional polarization rotator 503 is not used, the final beam will be of mixed polarization. For many applications, this will be acceptable. It can also have overlapping pulses since the last combiner simply puts the two beams together. If it is the last combiner in the entire system then the only requirement for combination is that both beams be polarized and oriented orthogonally. If one wants a polarized output, then they should first ensure the timing is such that no pulses overlap and keep track of the polarization of each pulse. They can then use the optional rotator 503 to rotate the polarization of selected pulses to get a linearly polarized output beam. This linearly polarized beam is a single pulsed laser beam and can be treated as such if further beam combination is desired.

Figure 6:
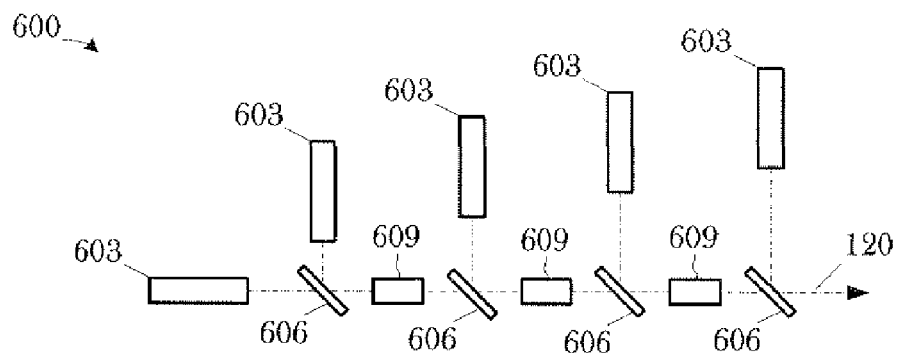

As is shown in FIG. 6, in some embodiments, the technique can be scaled up to larger numbers of components. Note that in the embodiment 600 of FIG. 6, the lasers 603, polarization combiners 606, and polarization rotators 609 can be combined in iterative stages to accomplish such a scaling. Note also that timing constraints get tighter as the number of components is scaled upward.

Figure 7:
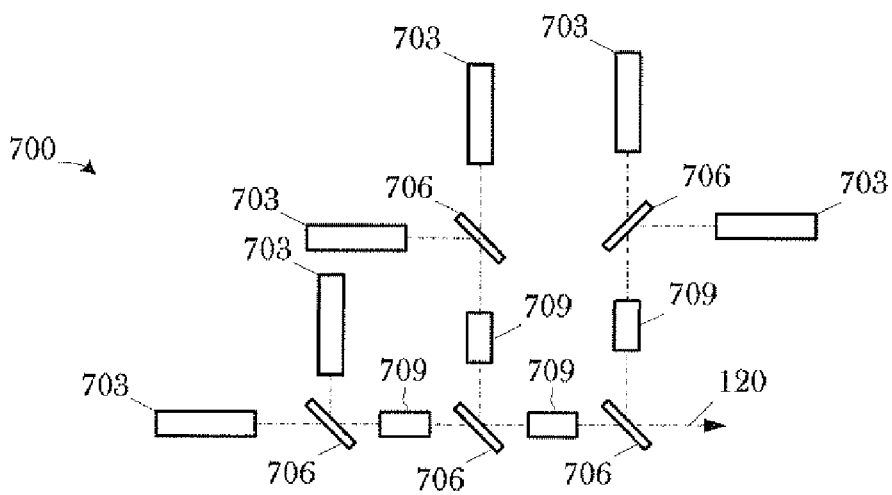

Each of the legs in the optical path can also be split again and again to include more lasers. A simple embodiment 700 of this type is shown in FIG. 7. The number of lasers 703 and splitting combinations 706 can be extended and the arrangements varied as long as all pulses are separated in time far enough to allow the rotators 709 to switch. Since the E/O rotator timing can be tailored to the laser timing the arrangement will work for short pulse lasers, long pulse lasers, or quasi-continuous lasers.

It is known that two polarized lasers, pulsed or continuous, can be combined into a single beam through use of a polarization combiner. This is a common technique and the devices are available commercially from, for example, http://www.klccgo.com/glanlaserbs.htm. This website shows a commercially available, off-the-shelf, combiner/splitter. It is one device, it combines two beams if they are of different polarizations and coming from different directions or it can split a beam whose polarization is at 45°. Thus, in some embodiments, the lasers 105, 106 and combiner 110 may be implemented alternatively in some embodiments.

Figure 8:
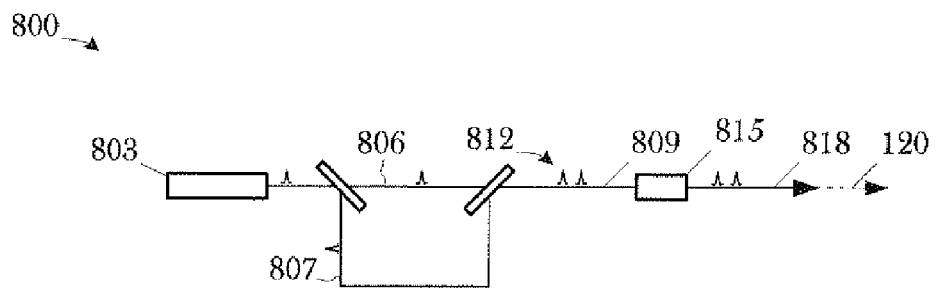

Polarization splitting can be used with an unpolarized pulsed laser if it is first rendered polarized. This can be done by putting a polarizer in front of the laser but this will result in power losses. It can be polarized without significant loss as in the embodiment 800 shown in FIG. 8. In this case the output of an unpolarized pulsed laser 803 is split into separate orthogonal polarization components 806, 807. One of the components, component 807, is delayed. The components 806, 807 are then recombined to form a beam 809 with twice as many pulses 812 alternating in polarization. A polarization rotator 815 is then used to rotate alternate pulses to create a polarized beam 818 without loss in total power but with double the pulse rate.

It is not necessary that the pulses be evenly spaced; only that they are non-overlapping and that their location in the pulse train is known. Once rendered polarized, the laser can then be polarization interlaced with other lasers.

The active polarization components disclosed herein are commercially available off the shelf. They are generally crystals that can rotate the polarization of a light beam passing through it with the amount of rotation depending on either a voltage or stress applied to the crystal. By far the most common active polarization element is an electro/optical rotator where the rotation depends on the voltage applied to the crystal. They are most often combined with a polarizer to form an on/off switch for light (i.e., an electro-optical ("E/O") Q switch). Some good notes about this are at http://.klccgo-.com/glanlaserbs.htm and some products are at http://www.eoc-inc.com/leysop/Faraday_optical_isolator_rota-tors.htm a list of companies making them is at http//photonics.com/directory/bg/category.asp?bgpsa=24400.

Polarization combiners are also commercially available off the shelf and quite well known in the art.

The present invention has no moving parts in the illustrated embodiments. Polarization rotation is normally accomplished with an electro-optical rotator, the amount of rotation is a function of the voltage applied to the crystal. In a typical case, the polarization would be rotated 90°. If a polarization dependent filter is placed after the rotator it will reflect or pass the light, depending on the polarization of the light hitting it. That is, turned one way the light will pass through the combiner, rotate the polarization 90° and the light will reflect off it. So, if one looks at the path from the laser of choice and the output, simply trace which polarizers (they are called polarizers for short, they are really polarization splitters/combiners) one wants to pass through and which one wants to reflect off to make it to the end then set the active rotators by setting the voltage across them so the beam polarization is correct at each juncture.

Thus, in accordance with the present invention, if the combined beams are pulsed and not overlapping then one can alter the polarization of each pulse individually and recreate a linearly polarized beam which is then ready to be combined again and again as often as is desired.

Note that the polarization interlacing technique disclosed herein is one for of time division multiplexed beam combination for laser signal generation. A mechanical technique is disclosed and claimed in U.S. application Ser. No. 11/530,213, Entitled, "Time Division Multiplexed Beam Combining for Laser Signal Generation", Filed Sep. 8, 2006, in the name of the inventor Nicholas J. Krasutsky. That application is under a common obligation to assign with this application.

The following references are hereby incorporated by reference for all purposes and form a part of this specification as if set forth verbatim herein:

U.S. Provisional Application Ser. No. 60/951,853, entitled "Laser Beam Combining by Polarization Interlacing", filed Jul. 25, 2007, in the name of the inventor Nicholas J. Krasutsky, and commonly assigned herewith; and U.S. application Ser. No. 11/530,213, entitled, "Time Division Multiplexed Beam Combining for Laser Signal Generation", filed Sep. 8, 2006, in the name of the inventor Nicholas J. Krasutsky, and commonly assigned herewith.

Each of these documents is furthermore hereby incorporated by reference.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus, comprising:
    a plurality of lasers, each generating, when in operation, a laser signal including a respective polarized laser pulse at a respective, staggered time relative to the other lasers;
    a plurality of polarization combiners that, in operation, sequentially combine the laser signals generated by the lasers; and a plurality of active polarization rotators to rotate the polarization of the combined laser signals as they are combined.

2. The apparatus of claim 1, wherein the lasers comprise:
means for generating a first pulsed laser signal; and
means for generating a second pulsed laser signal whose pulses do not overlap the pulses of the first pulsed laser signal in time.

3. The apparatus of claim 2, wherein the polarization combiners comprise means for combining a first and a second pulsed laser signal generated by the generating means, wherein the combining is performed through time division multiplexing that places the pulses of the first and second pulsed laser signals along a same optical path.

4. The apparatus of claim 1, wherein:
the laser signals generated by the lasers comprise pulsed laser signals; and
the polarization combiners comprise means for combining the first and second pulsed laser signals through time division multiplexing that places the pulses of the first and second pulsed laser signals along a same optical path.

5. An apparatus, comprising:
a first laser that, when in operation, generates a first polarized, pulsed laser signal;
a second laser that, when in operation, generates a second polarized, pulsed laser signal;
a first polarization combiner that, when in operation, combines the first and second laser signals to generate a combined laser signal;
an active polarization rotator that, when in operation, rotates the polarization of the combined laser signal; and
a third laser that, when in operation, generates a third polarized, pulsed laser signal.

6. The apparatus of claim 5, wherein the lasers comprise:
means for generating a first pulsed laser signal;
means for generating a second pulsed laser signal whose pulses do not overlap in time the pulses of a first pulsed laser signal generated by the means for generating a first pulsed laser signal; and
means for generating a third pulsed laser signal whose pulses do not overlap in time the pulses of the first pulsed laser signal or a second pulsed laser signal generated by the means for generating a second pulsed laser signal.

7. The apparatus of claim 6, wherein the polarization combiners comprise means for combining the first, second, and third pulsed laser signals through time division multiplexing that places the pulses from all interlaced lasers along the same optical path.

8. The apparatus of claim 5, wherein the polarization combiners comprise means for combining the first, second, and third pulsed laser signals through time division multiplexing that places the pulses from all interlaced lasers along the same optical path.

9. An apparatus comprising:
an active polarization rotator that, when in operation, rotates the polarization of a combined, polarization interlaced, laser signal;
a laser that, when in operation, generates a polarized, pulsed laser signal; and
a polarization combiner that, when in operation, combines the polarized, pulsed laser signal and the combined laser signals to generate a further combined laser signal.

10. The apparatus of claim 9, further comprising:
a second active polarization rotator capable of rotating the polarization of the further combined laser signal;
a second laser capable of generating a second polarized, pulsed laser signal; and
a second polarization combiner capable of combining the second polarized, pulsed laser signal and the further combined laser signals to generate a still further combined laser signal.

11. The apparatus of claim 9, further comprising a second rotator capable of rotating the polarization of the further combined laser signal.

12. A method, comprising:
generating a polarization interlaced, combined laser signal;
rotating the polarization of the combined laser signal;
generating a polarized laser pulse separated in time from a plurality of pulses of the combined laser signal; and
combining the polarized laser pulse into the combined laser signal.

13. The method of claim 12, further comprising polarizing the combined polarized laser pulse combined into the combined laser signal.

14. The apparatus of claim 12, wherein the combining includes moving a mirror between each laser pulse to direct the output pulses of each laser along the same optical path.

15. The method of claim 12, further comprising:
further rotating the combined laser signal;
generating a second polarized laser pulse separated in time from the pulses of the combined laser signal; and
combining the second polarized laser pulse into the combined laser signal.

16. A method for generating a laser signal, comprising:
generating a first pulsed laser signal from a first laser;
generating a second pulsed laser signal from a second laser such that the pulses of the second pulsed laser signal do not overlap the pulses of the first pulsed laser signal in time; and
combining the first and second pulsed laser signals through time division multiplexing.

17. The method of claim 16, wherein the combining employs a mechanical implementation.

18. The apparatus of claim 17, wherein the combining includes moving a mirror between each laser pulse to direct the output pulses of each laser along the same optical path.

19. The method of claim 16, wherein the combining employs a polarization interlacing.

20. An apparatus for generating a laser signal, comprising:
means for generating a first pulsed laser signal;
means for generating a second pulsed laser signal whose pulses do not overlap the pulses of the first pulsed laser signal in time; and
means for combining the first and second pulsed laser signals through time division multiplexing that places the pulses from the first and second pulsed laser signals along a same optical path.

21. The apparatus of claim 20, wherein the combining means employs a mechanical means.

22. The apparatus of claim 21, wherein the mechanical means includes a mirror that moves between each laser, pulse to direct the output pulses of each laser along the same optical path.

23. The apparatus of claim 20, wherein the combining means employs means for polarization interlacing.

* * * * *

UNITED STATES PATENT AND TRADEMARK OFFICE
CERTIFICATE OF CORRECTION

| | | |
|---|---|---|
| PATENT NO. | : 8,081,381 B2 | Page 1 of 1 |
| APPLICATION NO. | : 12/177559 | |
| DATED | : December 20, 2011 | |
| INVENTOR(S) | : Nicholas J. Krasutsky | |

It is certified that error appears in the above-identified patent and that said Letters Patent is hereby corrected as shown below:

Col. 8, line 59, in Claim 22, delete the "," between "laser" and "pulse" so that Claim 22 reads as follows: The apparatus of Claim 21, wherein the mechanical means includes a mirror that moves between each laser pulse to direct the output pulses of each laser along the same optical path.

Signed and Sealed this
Eighth Day of May, 2012

David J. Kappos
*Director of the United States Patent and Trademark Office*